United States Patent [19]

Henk et al.

[11] 4,331,744
[45] May 25, 1982

[54] LEAD SALT ELECTRIC STORAGE BATTERY

[75] Inventors: Peter O. Henk, Olstykke, Denmark; Ziemowit A. A. Piontkowski, deceased, late of Copenhagen, Denmark; by Christian G. Carlsen, administrator, Greve Strand, Denmark

[73] Assignee: Peter Axel Fischer, Hellerup, Denmark; a part interest

[21] Appl. No.: 190,884

[22] PCT Filed: Jul. 11, 1979

[86] PCT No.: PCT/DK79/00021
§ 371 Date: Mar. 12, 1980
§ 102(e) Date: Mar. 12, 1980

[87] PCT Pub. No.: WO80/00286
PCT Pub. Date: Feb. 21, 1980

[30] Foreign Application Priority Data

Jul. 12, 1978 [DK] Denmark .................... 3136/78

[51] Int. Cl.³ .................................... H01M 10/06
[52] U.S. Cl. .................................... 429/59; 429/188; 429/199; 429/225; 429/105
[58] Field of Search ............... 429/105, 188, 59, 225, 429/228, 241, 245, 199, 204, 195

[56] References Cited

U.S. PATENT DOCUMENTS

| | | | |
|---|---|---|---|
| 3,433,673 | 3/1969 | Duddy | 429/212 |
| 3,481,790 | 12/1969 | Duddy | 429/119 |
| 3,540,933 | 11/1970 | Boeke | 429/105 X |
| 3,813,301 | 5/1974 | Carr | 429/50 |
| 3,904,433 | 9/1975 | Frazier | 429/204 X |
| 4,001,037 | 1/1977 | Beck | 429/188 |
| 4,092,463 | 5/1978 | Wurmb et al. | 429/105 |
| 4,096,318 | 6/1978 | Wurmb et al. | 429/204 X |

FOREIGN PATENT DOCUMENTS 2451017 5/1976 Fed. Rep. of Germany .
2532512 2/1977 Fed. Rep. of Germany .

*Primary Examiner*—Anthony Skapars
*Attorney, Agent, or Firm*—Watson, Cole, Grindle & Watson

[57] ABSTRACT

In a one-cell or multi-cell lead salt electric storage battery with electrodes of first order, the anode of the cell or each cell has an active anode body (4) consisting of a textile material graphitized at a temperature of at least 2500° C. This active anode body is connected with an electrolyte-impervious, electrically conductive cell closure (1) consisting of moulded artificial resin with moulded-in, uniformly distributed short-cut graphite fibers likewise graphitized at a temperature of at least 2500° C. The connection between the active anode body and the cell closure is established either by gluing with an artificial resin glue (5) with mixed-in short-cut graphite fibers, likewise graphitized at a temperature of at least 2500° C., or by embedding fibers at the surface of the active anode body in the artificial resin of the cell closure (1) by temporary softening of the surface of said artificial resin by heat or by the application of a volatile solvent. The electrolyte consists of lead silicofluoride (PbSiF₆) and/or lead methane sulfonate (Pb(CH₃SO₃)₂) dissolved in water. The cell or each cell of the battery may be permanently hermetically closed because no gas is developed within the battery at any time.

7 Claims, 5 Drawing Figures

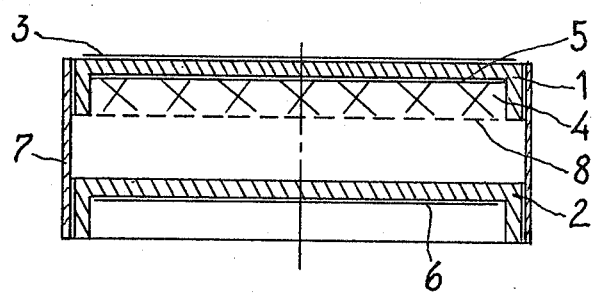
FIG. 1
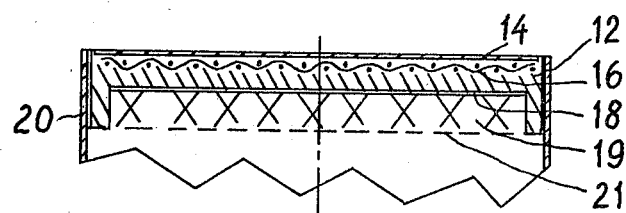
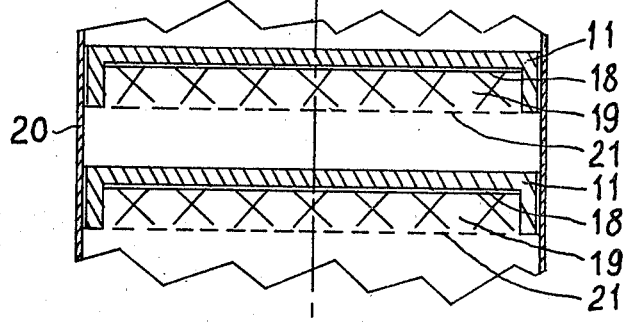
FIG. 2
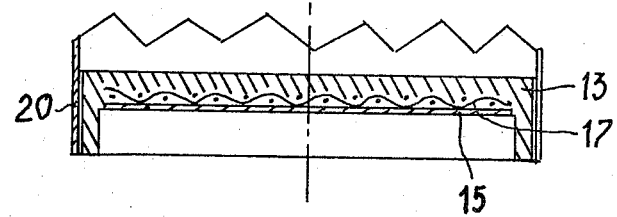

LEAD SALT ELECTRIC STORAGE BATTERY

BACKGROUND OF THE INVENTION

1. Field of the Invention

This invention relates to a lead salt electric storage battery with electrodes of first order, i.e. a battery in which the active materials are deposited as coatings on the electrodes during charging and are again dissolved in the electrolyte during discharging. Such batteries are know per se.

2. Prior Art

Electric batteries with electrodes of first order and electrolytes other than lead salts are also known in a great many varieties, and many of these have satisfactory properties for various uses. However, the invention is directed specifically to the problems of lead salt batteries, which have the potential advantage of providing a relatively inexpensive medium for the reversible storage of electric energy for general purposes.

Lead salt electric storage batteries of the type considered are known from the Western German published applications Nos. 2,451,017 and 2,532,512. These batteries contain as electrolyte aqueous solutions of lead salts of perchloric acid, tetrafluoro boric acid, hexafluoro silicic acid and/or amido sulfonic acid. From the electrolyte lead dioxide and metallic lead are deposited during charging on the anode and the cathode respectively in the form of coatings, from which they are again dissolved during discharging. By the anode is to be understood, throughout this specification, the electrode which forms the positive pole during discharge. In the known batteries considered the anode consists of a porous, graphite-filled artificial resin having a pore volume of 20-70% and containing 50-80% graphite by weight.

SUMMARY OF THE INVENTION

It is the object of the invention to construct a lead salt electric battery with electrodes of first order and with an anode body comprising graphite in such a manner as completely to avoid the development of gas, even transitionally, within the cell or each cell of the battery, while at the same time obtaining compactness of structure, a high mechanical, electrical and chemical stability and a high amp-hours capacity in relation to volume and weight.

According to the invention, a lead salt battery of the type described is characterized by the combination of the following features:

(a) the active anode body consists of a textile material graphitized at a temperature of at least 2500° C., (b) the active anode body is connected with an electrolyte-impervious, electrically conductive cell closure consisting of moulded artificial resin with moulded-in, uniformly distributed short-cut graphite fibers likewise graphitized at a temperature of at least 2500° C., (c) the connection between the active anode body and the cell closure is established either by gluing with an artificial resin glue with mixed-in short-cut graphite fibers, likewise graphitized at a temperature of at least 2500° C., or by embedding fibers at the surface of the active anode body in the artificial resin of the cell closure by temporary softening of the surface of said artificial resin by heat or by the application of a volatile solvent, (d) the electrolyte consists of lead silicofluoride ($PbSiF_6$) and/or lead methane sulfonate ($Pb(CH_3SO_3)_2$) dissolved in water.

It has been found that with the above mentioned combination of construction materials and electrolyte, development of gas in the cell is completely avoided, and a high chemical stability is achieved. An important factor in achieving this result is that the only electrically conducting material, to which the electrolyte has access on the anove side of the cell, is graphite which has been graphitized at a temperature of at least 2500° C.

A graphitized textile material distinguishes itself by having a great pore volume, e.g. about 85%, and the textile structure provides a particularly great pore surface as related to the pore volume. This surface consists of pure carbon in graphite form as contrasted to the combined carbon and artificial resin surface of the anode in the known lead salt batteries referred to above. This contributes to obtaining a high amp-hours capacity for a given volume and a given weight of a battery cell. In spite of the great pore volume a graphitized textile material has a satisfactory mechanical strength. Graphitized textile materials are available on the market and are e.g. used as a reinforcement for artificial resins. An example of a graphitized textile material is the product sold under the trade name SIGRATEX by Sigri Elektrographit GmbH. It is available in different types indicated by the addition of numerals indicating the woven structure and the graphitizing temperature which varies from 1000° C. to 2600° C. As mentioned, for the purposes of the present invention, a material graphitized at a temperature of at least 2500° C. should be used. A material marketed under the denomination SIGRATEX GDS 8-30 has been used for the construction of batteries according to the invention with good results. This material has been made by graphitizing a textile material consisting of polyacrylonitrile. It may be possible to develop other graphitized textile materials specially adapted for use as an anode material provided that the critical minimum graphitizing temperature of 2500° C. is observed. Advantageously, the pore volume of the graphitized textile material amounts to about 40-70% of the total electrolyte volume. The anode body may, if necessary, consist of more than one layer of the graphitized textile material. E.g. the above mentioned commerical product is available in a layer thickness of 0.9 mm and when using this material it has been found suitable to employ more than one, e.g. three layers of this material in a battery according to the invention. When two or more layers of graphitized textile material are used, these may suitably be connected with each other by sewing, preferably with graphite yarn. Thereby a very intimate electrical connection is obtained between the various layers of graphitized textile material. As a further possibility a plurality of textile material layers may be stitched together before the graphitizing so that the sewing yarn is graphitized together with the layers, or by special weaving methods a material may be produced which consists of a plurality of inter-woven layers which are then graphitized as a whole. It may also be possible to use a pile fabric.

When a plurality of layers of graphitized textile material is used, an alternative method of interconnecting these is to glue them together spot-wise by means of an electrically conducting glue or adhesive which would then fulfil the same conditions as will be specified below for the gluing together of the anode body and the cell closure. This is a simple method, but it will result in some reduction of the capacity and some increase of the contact resistance between the various layers.

Examples of artificial resins suitable for the moulding of the cell closure are polyethylene, polypropylene or polystyrene, with which graphite fibers are admixed before the moulding. Other artificial resins may also be used, provided of course that these materials do not in themselves give rise to the development of gas under the conditions prevailing in the cell, which may easily be determined by experiment. The graphite fibers are referred to above as "short-cut", and one way of producing such graphite fibers is to crush a graphitized textile material, such as that used for the anode body. It is advantageous, however, that the particles thereby produced should still have an elongated fibrous shape, because this contributes to increasing the conductivity of the cell closure. The graphite content may e.g. amount to about 30%.

For the purposes of the invention it is not essential that the element referred to as cell closure should in itself have a sufficient mechanical strength for structural purposes. Its function is to close the cell chemically on the anode side and it could fulfil this function even if it were in the form of an electrolyte-impervious film or coating on a plate of higher mechanical strength.

Examples of artificial resin glues or adhesives suitable for connecting the active anode body with the cell closure are polyisobutylene solution and polystyrene solution, with which graphite fibers are admixed as above mentioned. Other artificial resins may also be used, provided that they have satisfactory adhesive properties and do not in themselves give rise to the development of gas under the conditions prevailing in the cell. The gluing may take place over the whole area of the anode, but it is important that the glue does not to a substantial extent penetrate into the graphitized textile material because the pore volume would thereby be reduced. As regards the graphite fibers to be admixed with the glue, the same conditions apply as to the graphite fibers of the cell closure.

In the alternative method of uniting the anode body and the cell closure by embedding fibers at the surface of the active anode body in the artificial resin of the cell closure, the temporary softening of the surface of the said artificial resin may be performed by applying a volatile solvent, such as chloroform, to the surface of the cell closure, whereby the artificial resin material of the cell closure is superficially dissolved, whereafter the anode body is pressed against the cell closure, e.g. by weight-loading, so that the textile fibers at the surface of the anode body may penetrate into the softened artifical resin. When the solvent has evaporated, the artificial resin again becomes solid and thereby firmly holds the fibers of the textile materiale, while at the same time an ideal electric connection is established between the fibers of the anode body and the graphite fibers in the artificial resin material. An alternative method which has substantially the same result is to weld the anode body to the graphite-containing artificial resin material under the application of heat which wholly or partly melts or fuses the surface of the artificial resin material.

The use of lead silicofluoride ($PbSiF_6$) as an electrolyte is know per se, but not in combination with the structural arrangement of a cell as above described. As mentioned, lead methane sulfonate ($Pb(CH_3SO_3)_2$) may be used as an alternative to lead silicofluoride, though the capacity will thereby be somewhat reduced. The best results are obtained by using a mixture of lead silicofluoride and lead methane sulfonate in water. By adding lead methane sulfonate to lead silicofluoride an increase of the conductivity of the electrolyte is observed, and it is assumed that additionally a dissociation of a greater number of double negative lead salt ions is obtained. The advantage obtained by the use of lead methane sulfonate occurs already at a relative low proportion of this material and increases with this proportion up to a certain limit. According to the tests that have been run optimum results are obtained by using an aqueous solution which is about 1.8 molar in respect of lead silicofluoride and about 1.2 molar in respect of lead methane sulfonate. Moreover, the electrolyte may advantageously contain a small excess, about 0.15 molar, of the corresponding acids.

In the known lead salt batteries with electrodes of first order it is customary to arrange the electrodes in vertical position and to circulate the electrolyte along the electrodes by means of special pumping devices. These increase the weight of the battery, consume energy and detract from the reliability of the battery, because they are vulnerable and complicated devices. In contradistinction thereto, in accordance with a preferred embodiment of the invention, the cell or each cell of the battery is permanently hermetically closed and, at least during charging, is disposed with the electrodes in horizontal position and with the anode at the top. This arrangement is possible because the development of gas in the battery cell has been completely avoided, and owing to the horizontal arrangement of the electrodes the necessary movement of the electrolyte may take place by diffusion so that no pumping is required. By placing the cathode at the bottom of the cell during charging, the danger of the formation of dendrites with consequent danger of short-circuit is prevented.

The hermetically closed cells can be filled with the electrolyte by injection through a hole which is then closed by a stopper. If necessary, each individual cell may be provided with an expansion chamber or an expansible wall. Where a number of cells are surrounded by a common wall, this may, e.g. be constructed in the form of a bellows.

The material or materials used for the cathode, on which metallic lead is deposited during charging of the battery, are not subject to any critical conditions. For reasons of economic production it may be practical to make the cathode from the same materials as the cell closure on the anode side. This is particularly the case where a number of cells are superposed to form a multicell battery, because the anode may then simply be used as a bipolar electrode, the cell closure part of the anode forming the cathode of the cell next above. A cathode exactly corresponding to the cell closure of the anode, but without any anode body attached thereto may then form the bottom of the stack, and since this, like the cell closure, is electrically conducting, external conductors may be directly connected to these elements. Various examples of the connection of external conductors to the end elements of a battery will be described in the following.

BRIEF DESCRIPTION OF THE DRAWING

The invention will now be described in further detail with reference to some examples illustrated in the drawing, in which FIG. 1 shows diagrammatically a section through a one-cell battery representing a first and a second example, FIG. 2 shows a broken longitudinal section through a seven-cell battery representing a third example.

DETAILED DESCRIPTION

EXAMPLE 1

One-cell battery, FIG. 1

Figure 4:
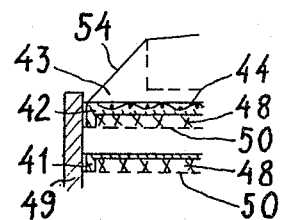
FIG. 4 shows on a larger scale a vertical part section through the battery of FIG. 3.

Two elements are made by moulding under heat and pressure from a mixture of one part by weight of polyethylene and two parts by weight of short-cut, e.g. crushed graphite fibers. The two elements, which each constitutes a circular plate with a thickness of 0.4 mm and a diameter of 50 mm with a protruding collar portion, are referred to as anode cap 1 and cathode cap 2 respectively. The anode cap 1 is electrolytically copper-plated on its outer face to form a thin layer 3, while an anode body 4 consisting of graphitized porous textile material is glued to the inner face of the anode cap 1 over the whole of its area by means of an electrically conducting glue 5 consisting of polyisobutylene and short-cut graphite fibers. The porous textile material, which has been graphitized at 2500° C., has a thickness of 2.7 mm and a pore volume of 85%. The cathode cap 2 is electrolytically copper-plated on its outer face to form a layer 6. A piece of liquid-permeable polypropylene paper 8 is glued to a thin-walled polyvinylchloride ring 7 so as to extend smoothly and in a stretched state across the cross-sectional area of the ring 7. The anode cap 1 is introduced into the ring 7 on one side of the polypropylene paper 8 so as to bring the graphitized porous textile material 4 into contact with the polypropylene paper 8, whereafter the cap 1 is fixed to the ring 7 by gluing. On the other side of the polypropylene paper the cathode cap 2 is introduced into the ring 7 and fixed by gluing in a position such that the free distance from the polypropylene paper 8 to the cap 2 is 2 mm. The polypropylene paper serves as a liquid-pervious supporting diaphragm or separator which prevents any detached graphite particles from penetrating into the electrolyte.

A hole is bored in the side of the ring 7, the electrolyte is injected and the hole is closed by means of a silicon rubber stopper. The electrolyte is an aqueous solution which is 3-molar in respect of lead silicofluoride and which additionally contains a small excess, 0.15-molar, of the corresponding acid.

With such a cell the following test results have been obtained:

By charging with 0.5 A the cell takes up 0.69 Ah. By discharging with 0.35 A it delivers 0.65 Ah in the course of 112 minutes, while at the same time the pole voltage drops from 1.8 V to 1.4 V. The average voltage during discharge is 1.66 V and the specific energy content is 46 Wh/kg.

EXAMPLE 2

One-cell battery, FIG. 1

The build-up is the same as in example 1, however, the electrolyte is in this case an aqueous solution which is 1.8-molar in respect of lead silicofluoride and 1.2-molar in respect to lead methane sulfonate. Moreover, there is a small excess of the corresponding acids corresponding to 0.15-molar.

The following test results have been obtained:

By charging with 0.5 A the cell takes up 0.69 Ah. By discharging with 0.35 A it delivers 0.65 Ah in the course of 112 minutes, while at the same time the pole voltage drops from 1.8 V to 1.4 V. The average voltage during discharge is 1.69 V and the specific energy content is 49 Wh/kg.

EXAMPLE 3

Seven-cell battery, FIG. 2

Six identical caps 11 are made by moulding under heat and pressure from 11 parts by weight of polystyrene and 10 parts by weight of crushed graphite fibers. The caps have a thickness of 0.5 mm and a diameter of 150 mm and are constructed with a protruding collar portion. Moreover, a top cap 12 and a bottom cap 13 are produced, each having a thickness of 1 mm. Tin-plated steel plates 14 and 15, respectively, having at thickness of 0.25 mm, and to which tin-plated steel wire nets 16 and 17, respectively, are attached by spot soldering, are pressed into the top cap 12 and the bottom cap 13, respectively. An anode body 19 having a thickness of 2.7 mm and consisting of porous textile material graphitized at 2500° C. and having a pore volume of 85% is fixed to each of the caps 11 and 12 in an interface layer 18 by means of chloroform vapour. The caps are introduced into and glued to a thin-walled polyvinylchloride tube 20 in the following succession starting from the bottom: 13, 11, ..., 11, 12. Immediately below each anode body 19 a piece of liquid-permeable polypropylene paper 21 is mounted at a distance of 2 mm from the cap 13, 11, ..., 11 next below by means of 2 mm high spacing rings distributed over the cross-sectional area.

Electrolyte is injected through holes bored in the wall of the tube 20, and the holes are then closed by means of silicon rubber stoppers. The electrolyte is an aqueous solution which is 1.8-molar in respect of lead silicofluoride and 1.2-molar in respect of lead methane sulfonate. Moreover, there is a small excess, 0.15-molar, of the corresponding acids.

The following test results have been obtained:

By charging with 4.5 A the battery takes up 6.2 Ah. By discharging with 3.15 A it delivers 5.8 Ah in the course of 110 minutes, while at the same time the pole voltage drops from 12.6 V to 9.8 V. The average voltage during discharge is 11.8 V and the specific energy content is 50 Wh/kg.

EXAMPLE 4

Figure 3:
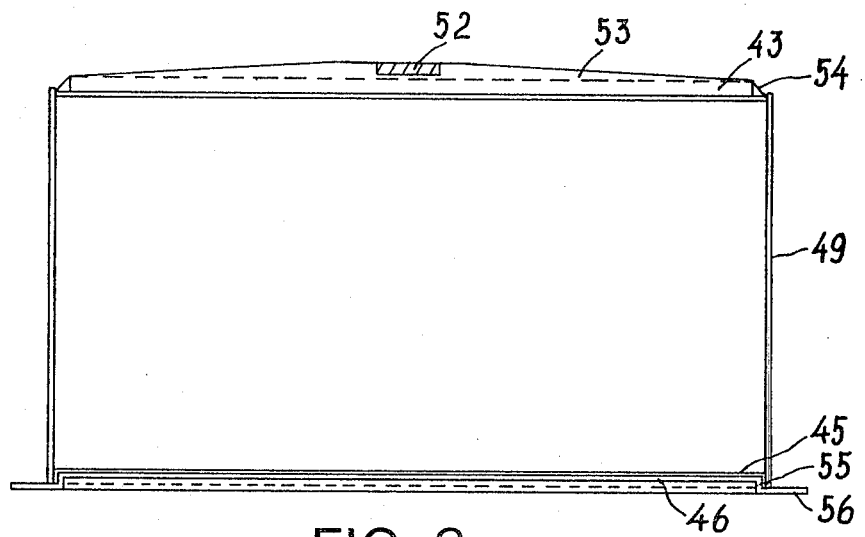
FIG. 3 is a side view of a sixty-cell battery representing a fourth example.
Figure 5:
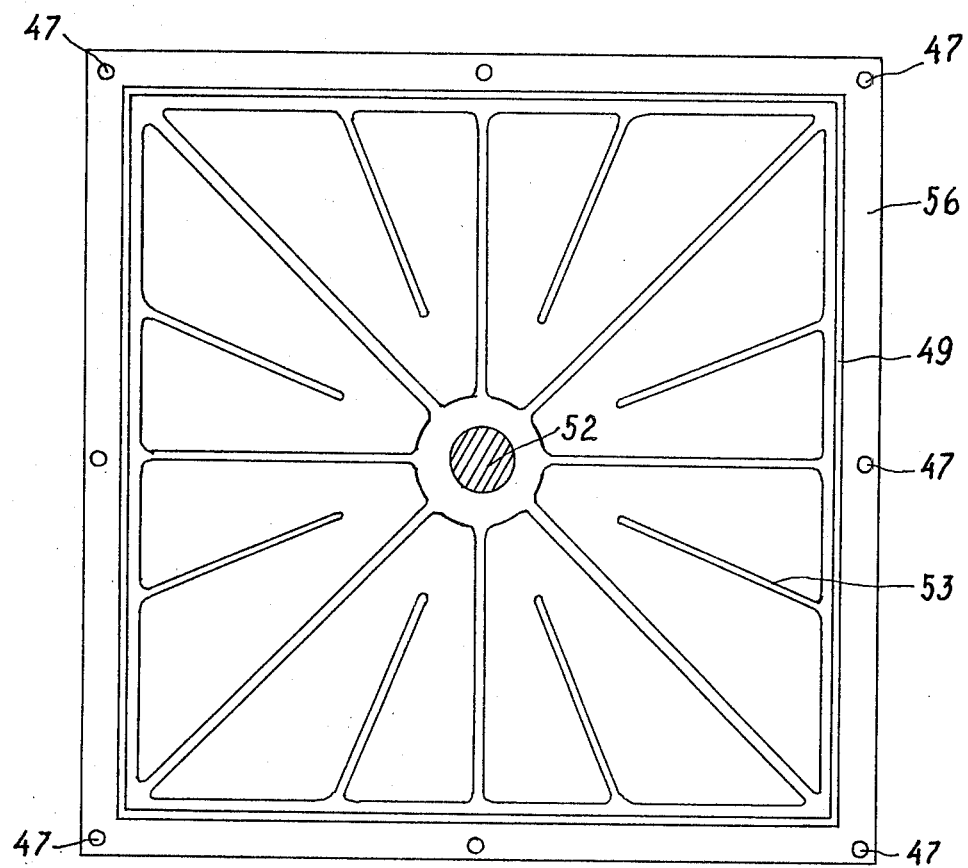
FIG. 5 is a top view of the battery of FIG. 3.

Sixty-cell battery, FIGS. 3, 4 and 5

Fiftynine identical caps 41 are made by moulding under heat and pressure from 11 parts by weight of polystyrene and 10 parts by weight of crushed graphite fibers. The caps have a thickness of 0.5 mm, are square with a side length of 550 mm and are constructed with a protruding collar portion. A top cap 42 is made from the same polystyrene/graphite fiber mixture and has a thickness of 1.5 mm. Moreover, an aluminum top cover 43 is made by injection moulding in the form of a square plate which on its upper side is constructed with reinforcement ribs 53 and an upwardly extending edge 54. A circular plug 52 of steel is pressed into a hole of the top cover 43 by crimping. The plug 52 is tin-plated on its top face. It serves for the connection of an outer supply conductor by means of a magnet. The aluminum top cover 43 is tin-plated on its underside, and a tin-plated steel wire net 44 is attached thereto by a multitude of spot solderings. The aluminum top cover is pressed into the top cap 42 with application of heat.

A bottom cap 45 having a thickness of 1.5 mm is made from the same polystyrene/graphite fiber mixture. A bottom cover 46 consisting of a steel plate, which is provided with a collar 55 and a flange 56, fits in the bottom cap. The flange 56 extends beyond the contour of the bottom cap and is provided with holes 47 for the electrically conducting fastening of the battery. The steel plate is tin-plated on its upper face and a tin-plated steel wire net is attached thereto by a multitude of spot solderings. The bottom cover 46 is pressed into the bottom cap 45 with the application of heat. An anode body 48 having a thickness of 3.6 mm and consisting of a porous textile material graphitized at 2500° C. and having a pore volume of 85% is welded into each of the fiftynine caps 41 by means of chloroform vapour. The caps are introduced into a square polyvinylchloride tube 49 and glued thereto in the following succession counted from the bottom: 45, 41, . . . , 41, 42. Immediately below each anode body 48 a piece of liquid-permeable polypropylene paper 50 is mounted at a distance of 3.3 mm from the cap 45, 41 . . . , 41 next below by means of small spacing rings (not shown) distributed over the cross-sectional area and having a height of 3.3 mm.

The electrolyte is injected through a hole bored for each cell in the wall of the tube 49, whereafter the holes are closed by means of silicon rubber stoppers. The electrolyte is an aqueous solution which is 2-molar in respect to lead silicofluoride and 1-molar in respect of lead methane sulfonate. Moreover, there is a small excess of the corresponding acids corresponding to 0.15-molar.

For this battery the following values have been calculated:

By charging with 70 A the battery takes up 136 Ah. By discharging with 62.5 A it delivers 125 Ah in the course of 120 minutes, while at the same time the pole voltage drops from 110 V to 84 V. The average voltage during discharge is 102.5 V and the specific energy content is 52 Wh/kg.

The term "artificial resins" as used in the description and claims of this application should be interpreted in its broadest sense, i.e. as generally synonymous with "plastics materials" (in German "Kunststoffe").

We claim:

1. Lead salt electric storage battery with electrodes of first order, having an active anode body comprising graphite, the combination comprising:
   (a) the active anode body comprising a textile material graphitized at a temperature of at least 2500° C.;
   (b) the active anode body is connected with an electrolyte-impervious, electrically conductive cell closure comprising molded artificial resin with molded-in, uniformly distributed short-cut graphite fibers graphitized at a temperature of at least 2500° C.;
   (c) the connection between the active anode body and the cell closure is established through a uniting interface layer consisting of artificial resin with graphite fibers embedded therein, said graphite fibers being graphitized at a temperature of at least 2500° C.;
   (d) the electrolyte comprising a mixture of lead silicofluoride and lead methane sulfonate dissolved in water, the proportion of lead silicofluoride ranging from 100 to 0%.

2. Lead salt electric battery as in claim 1 wherein the cell or each cell of the battery is permanently hermetically closed and is disposed with the electrodes in horizontal position and with the anode at the top.

3. Lead salt electric battery as in claim 1 wherein the electrolyte is an aqueous solution which is about 1.8-molar in respect of $PbSiF_6$ and about 1.2-molar in respect of $Pb(CH_3SO_3)_2$.

4. Lead salt electric battery as in claim 1 wherein the electrolyte contains a small excess, about 0.15-molar, of the corresponding acids.

5. Lead salt electric storage battery with electrodes of first order, as claimed in claim 1, wherein the connection between the active anode body and the cell closure is established by gluing with an artificial resin glue with mixed-in short-cut graphite fibers.

6. Lead salt electric storage battery with electrodes of first order as claimed in claim 1, wherein the connection between the active anode body and the cell closure is established by embedding fibers at the surface of the active anode body in the artificial resin of the cell closure by temporary softening of the surface of said artificial resin by heat.

7. Lead salt electric storage battery with electrodes of first order as claimed in claim 1, wherein the connection between the active anode body and the cell closure is established by embedding fibers at the surface of the active anode body in the artificial resin of the cell closure by temporary softening of the surface of said artificial resin by the application of a volatile solvent.

* * * * *